(12) United States Patent
Sutton

(10) Patent No.: US 7,644,643 B2
(45) Date of Patent: Jan. 12, 2010

(54) ESCUTCHEON FOR MAKING A STEERING WHEEL SPOKE APPEAR SYMMETRIC ABOUT A VERTICAL PLANE THROUGH THE STEERING WHEEL AXIS WHEN A VEHICLE IS BEING STEERED IN A STRAIGHT LINE

(75) Inventor: Anthony D. Sutton, Churubusco, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 602 days.

(21) Appl. No.: 11/384,102

(22) Filed: Mar. 17, 2006

(65) Prior Publication Data

US 2007/0214909 A1 Sep. 20, 2007

(51) Int. Cl.
*B62D 1/04* (2006.01)
*B62D 1/08* (2006.01)
*B60R 21/05* (2006.01)

(52) U.S. Cl. ............................. 74/552; 74/492; 74/558; 74/558.5

(58) Field of Classification Search ................... 74/552, 74/558, 558.5, 492; 29/894.1; 280/728.2, 280/750, 771
See application file for complete search history.

(56) References Cited

U.S. PATENT DOCUMENTS

| | | | | |
|---|---|---|---|---|
| 2,954,708 A | * | 10/1960 | Huzzard | 74/552 |
| 3,189,367 A | * | 6/1965 | Glass | 280/750 |
| 3,930,420 A | * | 1/1976 | Kizu et al. | 74/552 |
| 4,448,091 A | * | 5/1984 | Bauer et al. | 74/552 |
| 4,721,008 A | * | 1/1988 | Stoops et al. | 74/552 |
| 4,920,822 A | * | 5/1990 | Abiko | 74/552 |
| 5,060,535 A | * | 10/1991 | Fujita | 74/552 |
| 5,267,486 A | * | 12/1993 | Niwa et al. | 74/552 |
| 6,073,514 A | * | 6/2000 | Isomura | 74/552 |

* cited by examiner

*Primary Examiner*—Richard W L Ridley
*Assistant Examiner*—Thomas Diaz
(74) *Attorney, Agent, or Firm*—Jeffrey P. Calfa; Mark C. Bach

(57) ABSTRACT

A steering shaft (12) has an end toward a driver of the vehicle and is arranged to turn about an axis (27) to steer a vehicle. A hub (14) of a steering wheel assembly (13) is fastened to that end of the shaft. A spoke pattern of one or more spokes (15) extends away from the hub to a rim (17) that when grasped by the driver and turned, turns the shaft to steer the vehicle. With the rim turned to a position that steers the vehicle in a straight line of travel, the spoke pattern assumes a position of at least approximate symmetry with respect to a vertical plane through the axis. An escutcheon (24, 26) covers the one or more spokes to prevent the driver from having an unobstructed view of the one or more spokes and is positionable within a range of positions relative to the one or more spokes. The escutcheon is secured in a position within that range that presents to the driver an appearance of having essentially exact symmetry with respect to the vertical plane when the rim is in the position that steers the vehicle in a straight line of travel.

9 Claims, 4 Drawing Sheets

ESCUTCHEON FOR MAKING A STEERING WHEEL SPOKE APPEAR SYMMETRIC ABOUT A VERTICAL PLANE THROUGH THE STEERING WHEEL AXIS WHEN A VEHICLE IS BEING STEERED IN A STRAIGHT LINE

FIELD OF THE INVENTION

This invention relates generally to vehicles that are steered by steering wheels having hubs fastened to ends of steering shafts and one or more spokes connecting the hubs to rims that are grasped by drivers and turned to steer the vehicles. More especially, the invention relates to an escutcheon disposed in covering relation to one or a set of steering wheel spokes that is or are generally, but not necessarily exactly, symmetric about a vertical plane when the steering wheel is steering the vehicle in a straight line of travel.

BACKGROUND OF THE INVENTION

In most cars and trucks, the driver sits behind a steering wheel that he or she grasps and turns to steer the vehicle. For favorable driver perception of a vehicle, especially a new one, it is considered desirable that the steering wheel appear symmetric to the driver when the steering wheel is steering the vehicle in a straight line.

A condition of steering wheel asymmetry exists when a radial centerline that bisects a spoke or a set of spokes lies in a plane that is not vertical when the vehicle is being steered in a straight line.

In a steering system that is fully functional, a steering wheel that appears noticeably asymmetric when the vehicle is being steered in a straight line may incorrectly suggest a problem, or perhaps even a defect, to the driver or prospective purchaser, and at a minimum may create the impression of poor manufacturing quality. Extreme asymmetry may cause a condition that impairs driver visibility of instrument panel gauges and/or controls.

When a condition of asymmetry is deemed to need correction, a typical procedure is to disconnect the steering wheel from the steering shaft, re-position it on the shaft, and then re-connect it to the shaft.

The ability to make exactly the needed correction is problematic in a steering system where the steering wheel and steering shaft are connected to each other through a spline connection. Such a connection has a finite number of splines repeating at a defined angular interval. That fact presents only a finite number of possibilities for locating the wheel to the shaft.

If a typical angular spline interval is 4°, the resolution to which a splined steering wheel can be circumferentially registered with a splined steering shaft is the same. That constraint leaves the possibility that a steering wheel installed in accordance with proper assembly procedures may present the appearance of having up to 2° of asymmetry in either clockwise or counterclockwise direction when steering the vehicle in a straight line.

Furthermore, correction of asymmetry by disconnecting the steering wheel from the steering shaft and then re-connecting it to the shaft creates the potential for mistake if due care is not exercised. A service technician or other individual performing the correction must comply with specified procedures that are developed by manufacturers at significant expense. When a manufacturer has no control over such person and cannot monitor the work being performed, a serious mistake resulting from the inability of the manufacturer to supervise technician repair may adversely impact the manufacturer even though the manufacturer is not at fault in any way.

And regardless of the above considerations, the time, tools, and effort needed to correct steering wheel asymmetry are significant.

In some steering wheel assemblies, a functional spoke may itself be removable from the hub, and a repairperson may be tempted to correct spoke asymmetry by removing such a spoke and making some form of re-adjustment to correct asymmetry before reinstalling the spoke. But, that procedure also has the potential to compromise integrity of the steering system, especially if the re-attachment were to loosen.

SUMMARY OF THE INVENTION

The present invention provides a solution for achieving steering wheel symmetry without having to disconnect the steering wheel from the steering shaft and without having to disconnect, re-adjust, and re-connect a functional spoke. Principles of the invention are embodied both in a steering wheel assembly by a spoke cover, or escutcheon, and in a method for properly positioning and securing a spoke escutcheon that is a part of the steering wheel assembly.

The escutcheon can be positioned relative to a functional spoke and secured to the steering wheel so as to endow the steering wheel with the appearance of having a spoke or a spoke pattern exactly symmetric about a vertical plane when the wheel is steering the vehicle in a straight line of travel.

In the particular example that is shown and described here, the escutcheon is disposed in covering relation to a single steering wheel spoke that generally, but not necessarily exactly, assumes a six o'clock position when the steering wheel is steering the vehicle in a straight line of travel. The escutcheon is positionable in relation to the spoke, and when properly positioned relative to the spoke, is then secured in that position in the steering wheel assembly so as to endow the steering wheel assembly with the appearance of having a spoke exactly at the six o'clock position when the wheel is steering the vehicle in a straight line of travel.

One aspect of the invention relates to a steering assembly for steering a vehicle comprising: a shaft that has a proximal end toward a driver of the vehicle and that is arranged to turn about an axis to steer the vehicle. The steering wheel assembly comprises a hub fastened to the proximal end of the shaft and a spoke pattern of one or more spokes extending away from the hub to a rim that when grasped by the driver and turned, turns the shaft to steer the vehicle.

With the rim turned to a position that steers the vehicle in a straight line of travel, the spoke pattern assumes a position of at least approximate symmetry with respect to a vertical plane through the axis. An escutcheon covers the one or more spokes to prevent the driver from having an unobstructed view of the one or more spokes and is positionable within a range of positions relative to the one or more spokes. The escutcheon is secured in a position within that range that presents to the driver an appearance of having essentially exact symmetry with respect to the vertical plane when the rim is in the position that steers the vehicle in a straight line of travel.

Another aspect of the invention relates to a steering assembly for steering a vehicle comprising: a shaft that has a proximal end toward a driver of the vehicle and that is arranged to turn about an axis to steer the vehicle; and a steering wheel assembly that comprises a hub fastened to the proximal end of the shaft and a spoke pattern of one or more spokes extending away from the hub to a rim that when grasped by the driver and turned, turns the shaft to steer the vehicle. An escutcheon is disposed to cover the one or more spokes, positioned within a range of positions relative to the one or more spokes along an arc centered on the axis, and is secured in a desired position within that range.

A further aspect of the invention relates to a method for imparting to a spoke pattern of a steering wheel the appearance of exact symmetry with respect to a vertical plane through an axis of turning of the steering wheel in a steering assembly for steering a vehicle when the wheel has been turned to a position that steers the vehicle in a straight line of travel.

The method comprises disposing an escutcheon over the spoke pattern so as to prevent the driver from having an unobstructed view of the spoke pattern, positioning the escutcheon to a position within a range of positions relative to the spoke pattern that provides the exact symmetry, and securing the escutcheon to the steering wheel while in that position.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
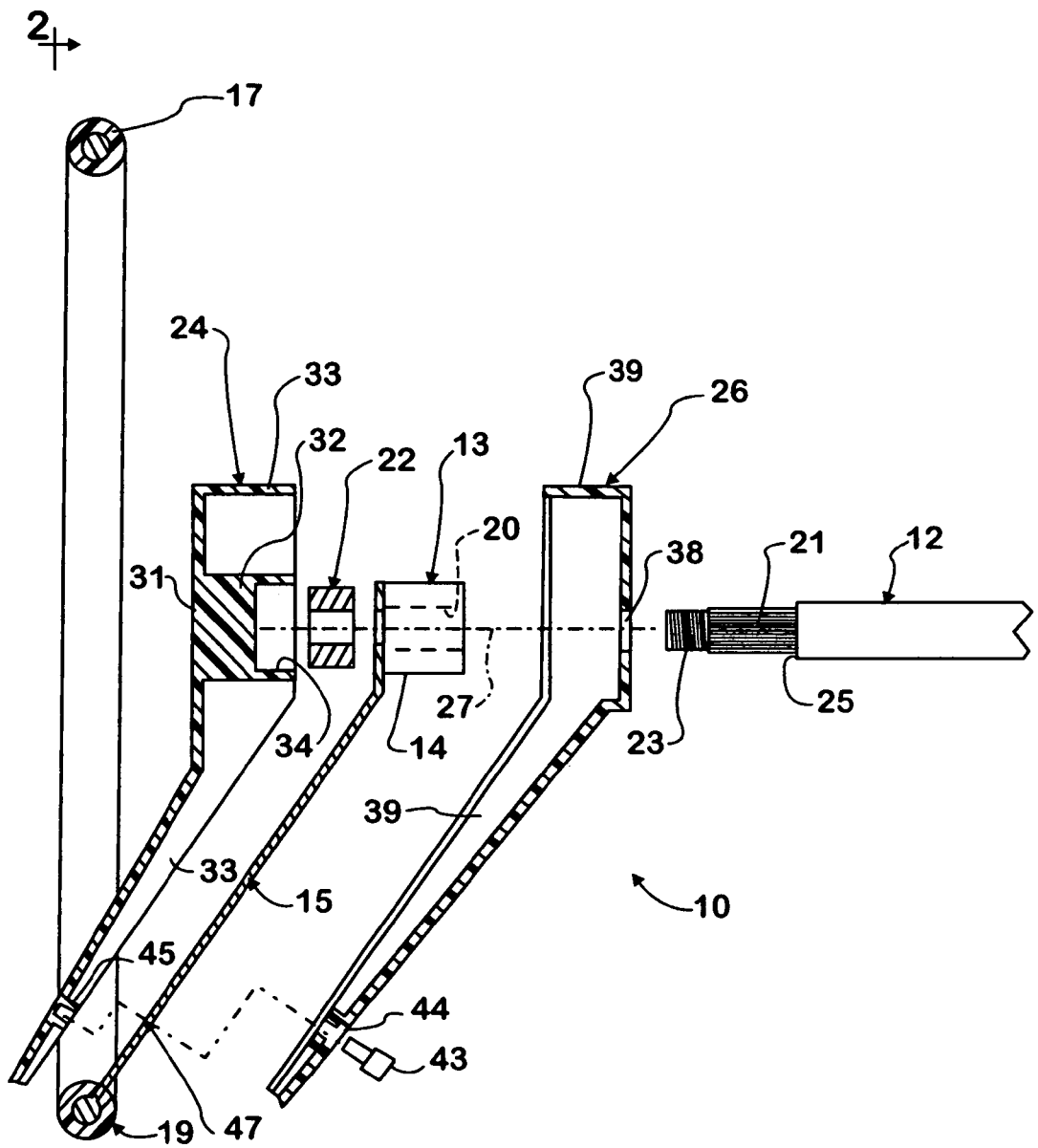
FIG. 1 is an exploded side elevation view, with some elements in cross section, of portions of a steering column assembly for steering a motor vehicle, such as a truck or car, to illustrate principles of the invention.
Figure 2:
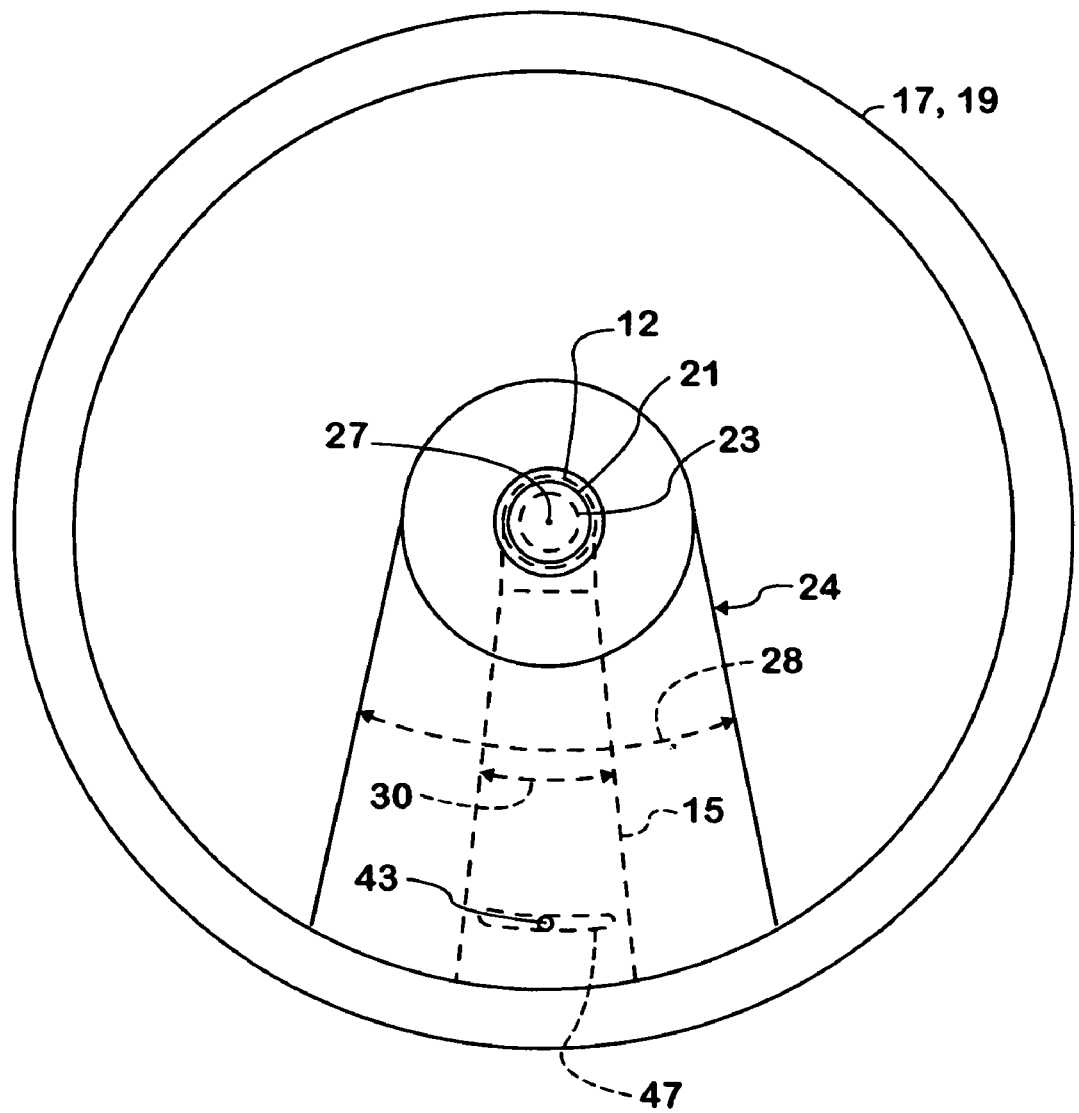
FIG. 2 is a full view of the direction of arrows 2-2 in FIG. 1.

FIGS. 1 and 2 show a motor vehicle steering column assembly 10 comprising a steering shaft 12 and a steering wheel assembly 13. Steering wheel assembly 13 comprises a central hub 14 and a spoke 15 that extends away from hub 14 to a circular rim 17 that is encased in an overmolded cover 19.

Hub 14 comprises a splined through-hole 20 that meshes with a mating external spline 21 on shaft 12 when wheel assembly 13 is assembled to shaft 12 by aligning the center of the hub with the proximal end of shaft 12 and axially advancing the wheel assembly onto the shaft axis 27. With the respective splines meshed, a screw thread 23 on the end of shaft 12 protrudes from through-hole 20, allowing a retaining nut 22 to be threaded onto the end of the shaft and tightened against the hub to proper torque, causing the hub to be forcefully captured between the nut and a shoulder 25 on shaft 12.

Hub 14, spoke 15, and rim 17 are sufficiently strong and rigid to transmit turning torque applied to rim 17 by a driver grasping cover 19 for causing the wheel to turn shaft 12 about axis 27, and hence steer the vehicle via a further portion of the steering system that need not be shown or discussed here.

Although steering wheel assembly 13 is shown here to have a single functional spoke 15 substantially at the six o'clock position, steering wheels typically have several spokes. The design of the steering system that includes the particular steering wheel assembly 13 shown here contemplates that spoke 15 will be symmetric with respect to a vertical plane that contains axis 27 when the steering wheel assembly is in a position that is steering the vehicle in a straight line of travel. In other words, the vertical plane will bisect the spoke such that one half of the spoke is clockwise of the six o'clock position and the other half is counterclockwise of six o'clock.

For any of various reasons such as tolerance stack-ups, wheel alignment, etc., precise symmetry may not exist. While some slight asymmetry may be tolerable, excess asymmetry may not be.

The invention provides the steering wheel assembly with the appearance of spoke symmetry when the steering wheel assembly is in a position that is steering the vehicle in a straight line of travel even when spoke 15 lacks such symmetry.

The appearance of such symmetry is provided by a frontal spoke escutcheon member 24 that is an element of steering wheel assembly 13. Frontal means in front of the spoke as seen by the driver. Escutcheon member 24 is preferably opaque so that when covering spoke 15, it conceals the true position of spoke 15 from the view of the seated driver.

In the preferred embodiment shown and described here, a rear spoke escutcheon member 26, also preferably opaque, cooperates with escutcheon member 24 to enclose essentially the entire spoke 15. Viewed frontally, as in any of FIGS. 2, 3, and 4, the circumferential extent of the two assembled escutcheon members 24, 26 (depicted by the numeral 28 in FIG. 2) exceeds that of spoke 15 (depicted by the numeral 30 in FIG. 2).

FIG. 2 shows spoke 15 exactly at the 6:00 o'clock position. This is the preferred position when the steering wheel is positioned to steer the vehicle in a straight line of travel because the appearance of the spoke is symmetric about a vertical plane containing axis 27. The two escutcheon members form an escutcheon that essentially fully encloses spoke 15 and that is also exactly at the 6:00 o'clock position.

Each escutcheon member 24, 26 is preferably fabricated from a suitable plastic using known plastic molding techniques. Escutcheon member 24 comprises a frontal wall 31 from the rear of which, near a lengthwise end of the escutcheon member in the vicinity of the center of the wheel, extends a hub 32 having a blind hole 34 for receiving nut 22 when escutcheon member 24 is assembled into the steering wheel assembly. It is wall 31 that is fully seen in FIGS. 2, 3, and 4.

Except for the portion that runs along rim cover 19, the perimeter of wall 31 is bounded by a perimeter wall 33 that extends from wall 31 generally toward the front of the vehicle. The height of wall 33, meaning in the general direction toward the front of the vehicle and away from the driver, is uniform along a circularly contoured perimeter portion of wall 33 concentric with axis 27. From opposite ends of that uniform height wall portion, wall height tapers toward rim cover 19, ending in almost zero height at rim cover 19. Escutcheon member 24 therefore has what may be considered a generally rearwardly open walled cavity shaped for conformance to that of steering wheel assembly 13 and its attachment to shaft 12, so as to frontally enclose spoke 15.

Escutcheon member 26 comprises a rear wall 37 containing a through-hole 38 that allows it to fit over the proximal end of shaft 12. Except for the portion that runs along rim cover 19, the perimeter of wall 37 is bounded by a perimeter wall 39 that extends generally frontally from wall 37, meaning generally toward the driver. The height of wall 39, meaning in the general direction toward the driver, is uniform along a circularly contoured perimeter portion of wall 39 concentric with axis 27. From opposite ends of that uniform height wall portion, wall height tapers toward rim cover 19, ending in almost zero height at rim cover 19. Escutcheon member 26 therefore comprises what may be considered essentially a frontally open walled cavity having a perimeter shaped to conform with that of escutcheon 24 to enclose spoke 15 from the rear.

The respective perimeter walls 33, 39 are essentially congruent to enable them to fit to each other. The sizes of holes 34 and 38 allow the respective escutcheons members to turn about axis 27 relative to spoke 15 when nut 22 is fastening steering wheel assembly 13 to shaft 12.

Escutcheon members 24, 26 are held together by a headed fastener, such as a headed screw, 43 that passes through a clearance hole 44 in escutcheon member 26 and into an attachment hole 45 in escutcheon member 24. In doing so, the shank of fastener 43 passes through a slot 47 in spoke 15 that has a uniform width and a limited length that is arcuately concentric with axis 27.

When fastener 43 is not fully tightened, it allows the escutcheon that is created by the attached escutcheon members 24, 26 to turn about axis 27 relative to spoke 15. The extent to which the two members can turn is limited by abutment of the fastener shank with the ends of the slots.

Figure 3:
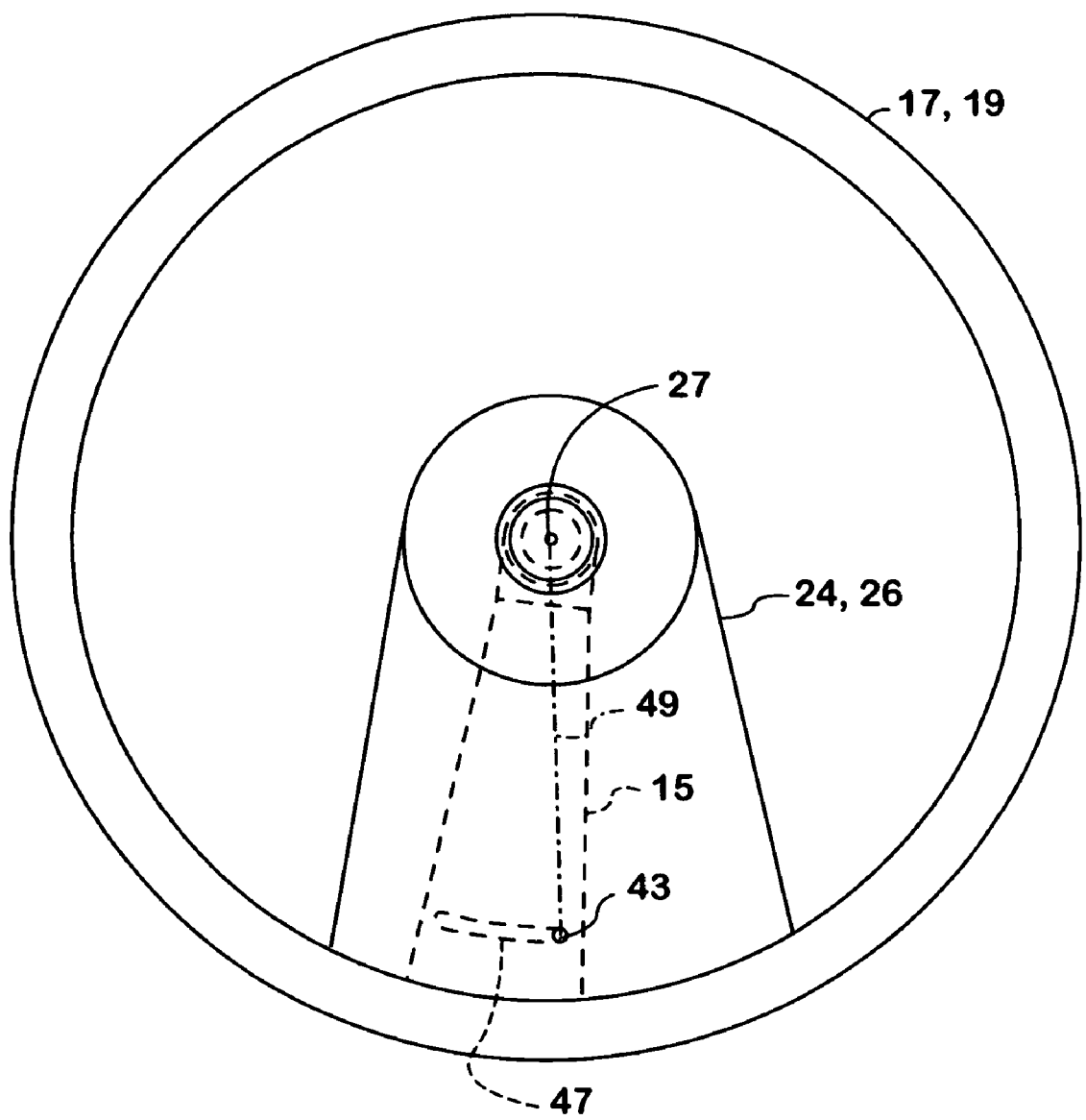
FIG. 3 is a view similar to FIG. 2 showing a relative positioning of certain elements different from that of FIG. 2.
Figure 4:
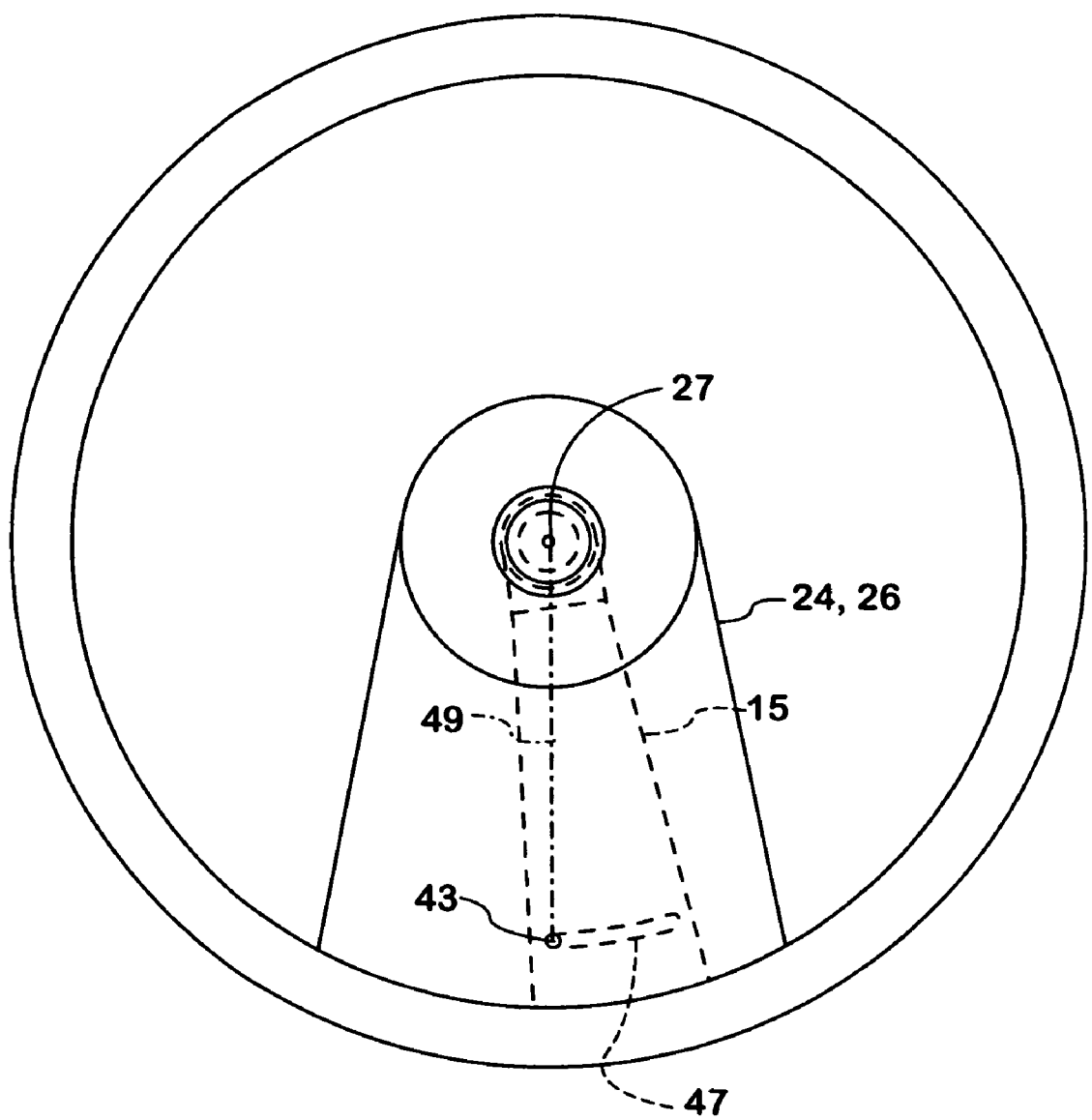
FIG. 4 is a view similar to FIG. 2 showing another different relative positioning.

FIG. 3 shows the escutcheon swung maximally counter-clockwise relative to spoke 15 while FIG. 4 shows it swung maximally clockwise relative to spoke 15. Thus, the attached escutcheon members are positionable as one over a range that is long enough for a range of positions that spoke 15 can assume about axis 27 when steering wheel assembly 13 is steering the vehicle in a straight line to allow the attached escutcheons to be placed exactly at the 6:00 o'clock position (reference numeral 49) and then secured in place by tightening fastener 43, concealing spoke 15 from driver view in the process. The range of positioning that is provided by slot 47 because it has an arcuate length, as measured circumferentially about axis 27, exceeding its width as measured radially of axis 27, covers a span that exceeds the spline interval of the spline connection of the steering wheel to the steering shaft.

Moreover, this is accomplished without disconnecting or loosening any component of the vehicle steering system between steering wheel rim 17 and the steered wheels (not shown) at the front of the vehicle. While the illustrated arrangement provides apparent symmetry for a single spoke at 6:00 o'clock position, principles of the invention can be applied to other numbers of spokes and other wheel geometries.

With the arrangement that is shown here, escutcheon member 26 is first placed over shaft 12 and then steering wheel assembly 13 is attached to the shaft. This would be the typical assembly procedure in the controlled environment of a vehicle assembly plant where compliance with specified steps of the procedure can be monitored by the manufacturer.

With the steering wheel assembly having been assembled to the steering shaft with at least approximately desired spoke orientation, the finished vehicle can be driven for a short distance to ascertain orientation of the steering wheel that steers the vehicle in a straight line. With the escutcheon members loosely attached, they can be swung about axis 27 to the exact 6:00 o'clock position of symmetry, with fastener 43 then being tightened to secure them in that position in the steering wheel assembly.

The ability to secure such exact positioning of the escutcheons is not limited by the nature of the connection of the steering wheel assembly to the shaft, such as the spline intervals in a spline connection, between hub 14 and shaft 13. The escutcheons can be moved in infinitely small increments within the range of positioning provided by slot 47. Because the steering wheel does not need to be removed, and because a functional spoke does not need to be removed, re-adjusted, and replaced, the original factory integrity of the steering wheel assembly and its installation in a vehicle can be maintained.

While a presently preferred embodiment of the invention has been illustrated and described, it should be appreciated that principles of the invention apply to all embodiments falling within the scope of the following claims.

What is claimed is:

1. A steering assembly for steering a vehicle, the assembly comprising:
    a shaft that has a proximal end toward a driver of the vehicle and that is arranged to turn about an axis to steer the vehicle; and
    a steering wheel assembly that comprises a hub fastened to the proximal end of the shaft and a spoke pattern of one or more spokes extending away from the hub to a rim that when grasped by the driver and turned, turns the shaft to steer the vehicle, wherein with the rim turned to a position that steers the vehicle in a straight line of travel, the spoke pattern assumes a position of at least approximate symmetry with respect to a vertical plane through the axis, and an escutcheon that is disposed to cover the spoke pattern to prevent the driver from having an unobstructed view of the one or more spokes, that is positionable within a range of positions relative to the spoke pattern, and that is secured in a position within that range that presents to the driver an appearance of having essentially exact symmetry with respect to the vertical plane with the rim in the position that steers the vehicle in a straight line of travel,
    wherein the escutcheon is positionable along an arc centered on the axis and defined by an arcuate through-slot in a spoke of the spoke pattern within which a part attached to the escutcheon travels, the through-slot having an arcuate length, as measured circumferentially about the axis, exceeding the through-slot's width as measured radially of the axis.

2. An assembly as set forth in claim 1 wherein the escutcheon comprises a frontal escutcheon member disposed frontally of the one or more spokes, and a rear escutcheon member disposed rearwardly of the one or more spokes, and the part that travels within the through-slot comprises a fastener that fastens the frontal and rear escutcheon members together to secure the escutcheon in the position that presents to the driver an appearance of having essentially exact symmetry with respect to the vertical plane with the rim in the position that steers the vehicle in a straight line of travel.

3. An assembly as set forth in claim 2 wherein at least the frontal escutcheon member comprises an opaque plastic.

4. An assembly as set forth in claim 2 wherein the frontal escutcheon member comprises a rearwardly open walled cavity having a hub containing a blind hole within which is received a nut that fastens the steering wheel assembly to the steering shaft.

5. An assembly as set forth in claim 2 wherein the rear escutcheon member comprises a frontally open walled cavity and a through-hole through which the steering shaft passes.

6. An assembly as set forth in claim 5 wherein the frontal escutcheon member comprises a rearwardly open walled cavity having a hub containing a blind hole within which is received a nut that fastens the steering wheel assembly to the steering shaft, and the escutcheon members have congruent perimeter wall portions that fit to each other.

7. A steering assembly for steering a vehicle, the assembly comprising:

a shaft that has a proximal end toward a driver of the vehicle and that is arranged to turn about an axis to steer the vehicle; and a steering wheel assembly that comprises a hub fastened to the proximal end of the shaft and a spoke pattern of one or more spokes extending away from the hub to a rim that when grasped by the driver and turned, turns the shaft to steer the vehicle, and an escutcheon that is disposed to cover the one or more spokes, that is positionable within a range of positions relative to the one or more spokes along an arc centered on the axis, and that is secured in a desired position within that range, wherein the escutcheon is secured in a position that presents to the driver an appearance of having essentially exact symmetry with respect to a vertical plane passing through the axis with the rim in a position that steers the vehicle in a straight line of travel, and the arc is defined by an arcuate through-slot in a spoke of the spoke pattern within which a part attached to the escutcheon travels, the through-slot has an arcuate length, as measured circumferentially about the axis, exceeding the through-slot's width as measured radially of the axis, the escutcheon comprises a frontal escutcheon member disposed frontally of the one or more spokes and a rear escutcheon member disposed rearwardly of the one or more spokes, and the part that travels within the through-slot comprises a fastener that fastens the frontal and rear escutcheon members together to secure the escutcheon in the desired position.

8. An assembly as set forth in claim 1 wherein the hub has a spline connection to the proximal end of the shaft and the range of positions covers a span that exceeds the spline interval of the spline connection.

9. An assembly as set forth in claim 7 wherein the hub has a spline connection to the proximal end of the shaft and the range of positions covers a span that exceeds the spline interval of the spline connection.

* * * * *